United States Patent
Zeug et al.

[15] 3,698,694
[45] Oct. 17, 1972

[54] INJECTION APPARATUS

[72] Inventors: Hubert Zeug, Kosakenberg; Friedrich Koch, Feldstrabe, both of Germany

[73] Assignee: Desma-Werke G.m.b.H., Uesen near Breman, Germany

[22] Filed: June 29, 1971

[21] Appl. No.: 157,977

[30] Foreign Application Priority Data

July 7, 1970 Germany..........P 20 33·548.2

[52] U.S. Cl. ..................................................259/191
[51] Int. Cl. ..................................................B01f 7/08
[58] Field of Search......259/191, 192, 193, 9, 10, 97, 259/45, 46; 100/144

[56] References Cited

UNITED STATES PATENTS 3,209,408  10/1965  Kelly ..........................259/191
3,239,882  3/1966  Yokana ......................259/191
3,317,962  5/1967  Morse ........................259/191
3,319,299  5/1967  Kiraly ........................259/191

*Primary Examiner*—Robert W. Jenkins
*Attorney*—Eugene Dacey

[57] ABSTRACT

An injection apparatus of the kind embodying a screw reciprocably mounted in a chamber by means of which a plasticizable material is plasticized and advanced along the chamber and then ejected at the forward end thereof; characterized in that there is a device associated with the head of the screw operable to prevent reverse flow of the plasticized material during the forward movement of the screw when effecting ejection.

11 Claims, 6 Drawing Figures

INJECTION APPARATUS

BACKGROUND OF THE INVENTION

Various expedients have been employed in injection apparatus of the kind wherein a screw is employed both to effect plasticization and ejection to prevent reverse flow of the plasticized material as it is ejected by the forward movement of the screw in the barrel, one such device being shown in German Pat. No. 1,128,637, comprising a resilient ring which is expanded by the wedging action of the screw during its forward movement and by the reactive pressure of the material being ejected to provide a seal between it and the wall of the injection chamber. Such a ring introduces considerable friction and wear, of the ring itself by reason of the fact that there is relative rotation between it and the screw and by wear on the inner surface of the chamber by the longitudinal movement of the ring therein while under pressure. The present invention provides for a device which will prevent reverse flow without the disadvantages of the resilient ring referred to by eliminating the relative rotational movement of the device and screw, by eliminating the need for a seal between the device and the inner surface of the chamber and by providing for lubrication between the device and the wall of the chamber.

SUMMARY

As herein illustrated, the apparatus comprises an elongate cylindrical chamber and a reciprocably mounted screw situated in the chamber by means of which plasticizable material is adapted to be plasticized and advanced along the chamber by rotation of the screw and to be ejected by reciprocation of the screw; a part for preventing reverse flow of the plasticized material during ejection, said part being supported on the leading end of the screw for axially movement thereon, and corresponding in outside diameter substantially to the inside diameter of the chamber and having an axial passage from one end to the other, and axially spaced shoulders on the leading end of the screw between which the part is located, said screw being movable forwardly relative to the part as it is moved to effect ejection to bring one of the shoulders into engagement with the member to close the axial passage and movable rearwardly relative to the part as it is moved in retraction to bring the other shoulder into engagement with the part to open the axial passage. The part is non-rotatably mounted on the head of the screw and is axially shorter than the axial distance between the shoulders. The outer cylindrical surface of the part has a shallow helical groove therein and at the opposite ends there are conical recesses within which the shoulders are adapted to engage.

The invention will now be described in greater detail with reference to the accompanying drawings wherein.

Figure 1:
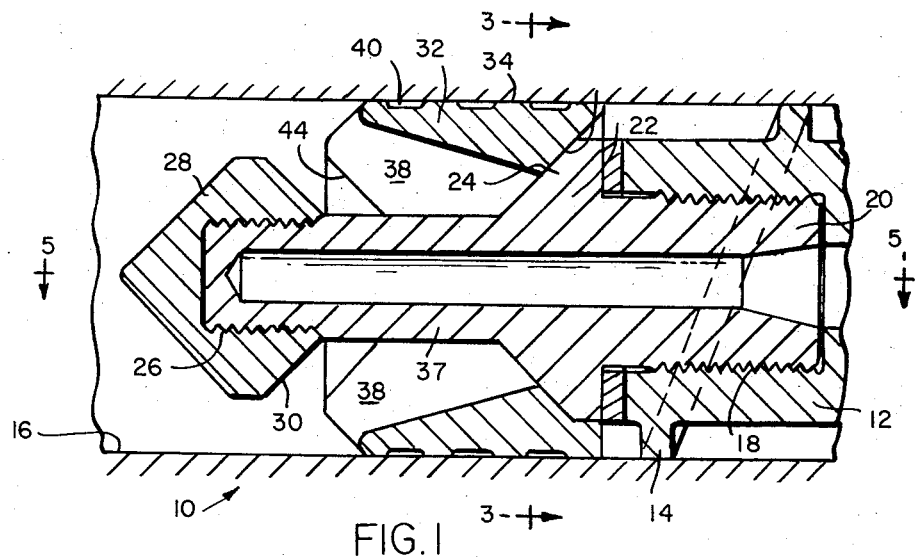
FIG. 1 is a fragmentary diametrical section of the forward end of an injection chamber in which there is rotatably and reciprocably mounted a screw provided with the device for preventing reverse flow of the plasticizable material in the chamber, with the device shown in its operative position such as to prevent reverse flow.

Referring to the drawings, the reference character 10 represents a portion of the chamber of an injection apparatus within which there is mounted for rotation and reciprocation a screw 12 provided with a helical rib 14 which closely engages the interior cylindrical surface 16 of the chamber. The forward or leading end of the screw 12 contains an axially threaded opening 18 into which there is screwed the threaded end 20 of a head member 22, the latter forming an extension of the screw and being provided at its rear end with a shoulder 24 and at its forward end with a threaded portion 26 on which there is mounted a cap 28. The rear side of the cap 28 comprises a shoulder 30 which is axially spaced from the shoulder 24. In accordance with this invention there is mounted on the head between the shoulders 24 and 30 a part 32 which comprises a reverse flow preventer. The part 22 is of circular cross-section having an outside surface 34 corresponding substantially in diameter to the inside diameter of the chamber 10 and an interior opening comprising a non-circular portion 36 generally rectangular in configuration which is slidably and non-rotatably engaged with a portion 37 of the head between the shoulders 24 and 30 which is of substantially the same cross-sectional configuration. At opposite diametrically disposed sides of the opening 36 there are lobelike channels 38—38. The outside surface 34 of the part 32 contains a shallow helical groove 40 of substantially rectangular cross-section and at opposite ends there are conical recesses, at the rear a recess 42 and at the front a recess 44. These recesses correspond in slope to the shoulders 24 and 30. The channels 38—38 are inclined with respect to the axis of the head, the forward ends being located outwardly of the conical recess 44 at the forward end and the rear ends being located inwardly of the conical recess 42 at the rear end.

The part 32 as thus mounted on the head is movable axially between the shoulders 24 and 30 but is compelled to rotate with the head by means of the non-circular interengaged portions 36 and 38 of the part and the head.

Figure 2:
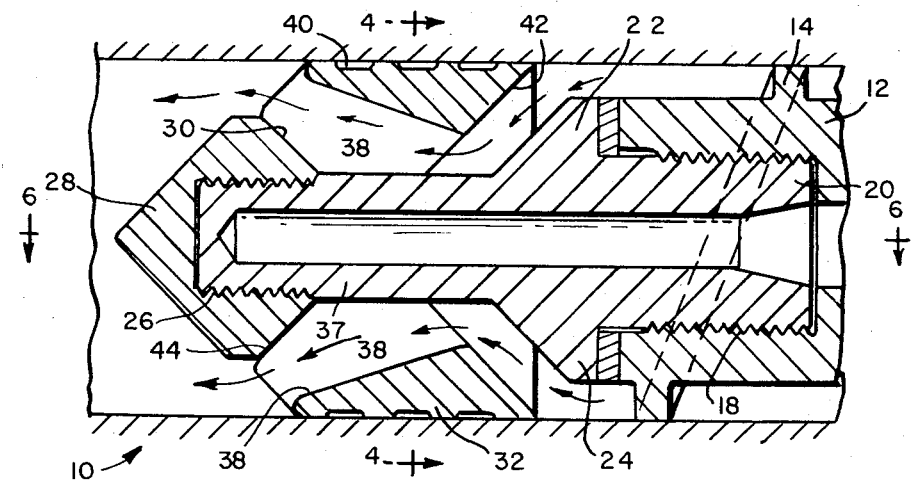
FIG. 2 is a corresponding section showing the device in its inoperative position where the plasticized material is free to flow through the device into the forward or discharge end of the chamber.
Figures 3, 4:
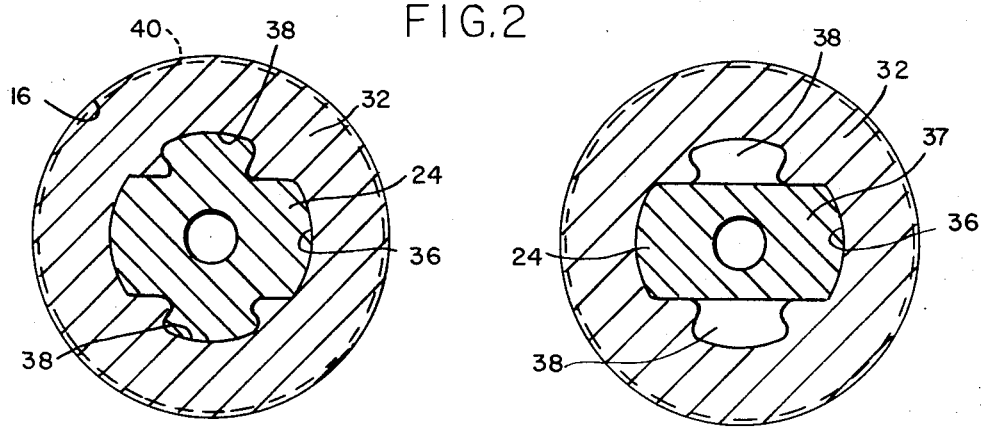
FIG. 3 is a section taken on the line 3—3 of FIG. 1.
FIG. 4 is a section taken on the line 4—4 of FIG. 2.
Figure 5:
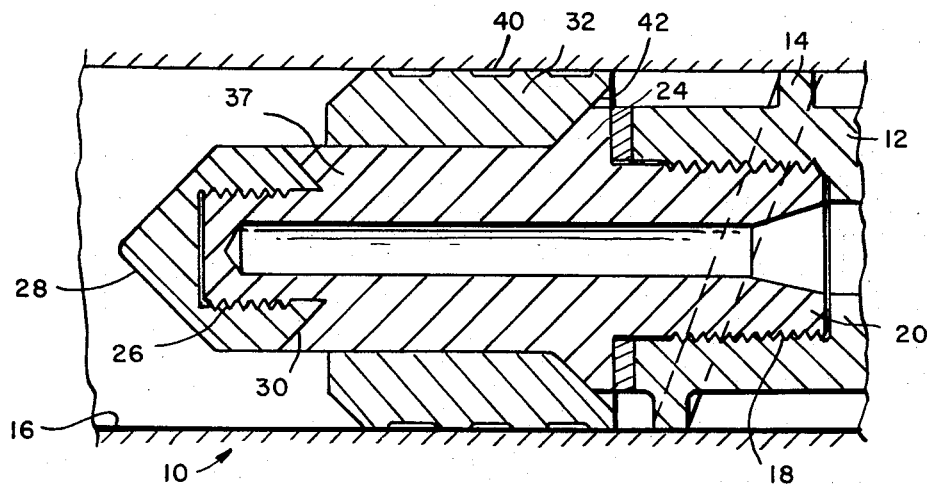
FIG. 5 is a diametrical section taken at right angles to that shown in FIG. 1.
Figure 6:
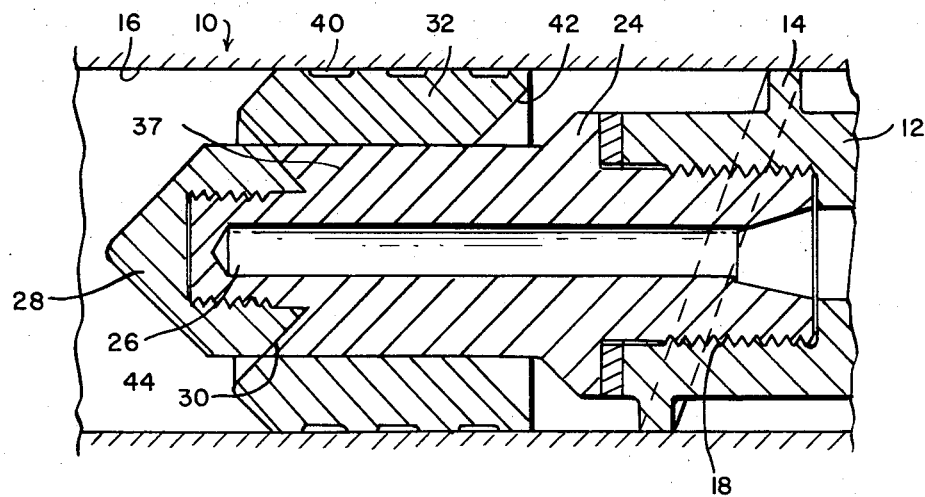
FIG. 6 is a diametrical section taken at right angles to that shown in FIG. 2.

In operation forward movement of the screw 12 to effect ejection brings the surface of the conical shoulder 24 into engagement with the surface of the conical recess 42 at the rear end of the part, closing the rear ends of the channels 38—38 which are situated radially inwardly of the periphery of the shoulder as clearly shown in FIG. 1, thus blocking return flow of the plasticized material. Retraction of the screw following ejection moves the surface of the conical shoulder 30 at the rear side of the cap 28 into engagement with the surface of the conical recess 42 and simultaneously moves the surface of the conical shoulder 24 away from the surface of the conical recess 42 thus uncovering the channels 38—38 so that flow can now take place from the rear side of the part through the channels 38—38 to the forward side thereof as shown by the arrows in FIG. 2. Engagement of the shoulder 30 with the recess 44 does not close the channels 38—38 since the latter, as pointed out above, are situated radially outwardly of the shoulder 44.

During the entire operation of the apparatus the part 32 rotates with the screw 12 while being free on the head 22 so that the screw can be reciprocated relative thereto. The shoulders and surfaces of the recesses with which they are adapted to be brought into engagement are rigid and the seal is achieved by engagement of these surfaces without any deformation or expansion of the part 32 and so without friction losses. In addition, by provision of the helical groove 40 in the surface of the part 32 a certain amount of lubrication is afforded by entrance of a thin film of the thermoplastic between the outer surface of the part 32 and the inner surface 16 of the injection chamber. The helical form of the groove insures that the thermoplastic material which enters between these surfaces and provides lubrication therefor is conveyed forwardly from the rear side to the forward side so that it is constantly renewed and does not become hardened or carbonized. Additionally, its constant discharge clears the material so that if a color change is made there will be no undesirable residue of the preceding material to become mingled with the new material.

It should be understood that the present disclosure is for the purpose of illustration only and that this invention includes all modifications and equivalents falling within the scope of the appended claims.

We claim:

1. Injection apparatus comprising an elongate cylindrical chamber and a reciprocably mounted screw situated in the chamber by means of which plasticizable material is adapted to be plasticized and advanced along the chamber by rotation of the screw and to be ejected by reciprocation of the screw, a part for preventing reverse flow of the plasticized material during ejection, said part being supported on the leading end of the screw for axial movement thereon, said part corresponding in outside diameter substantially to the inside diameter of the chamber and having an axial passage from one end to the other, and axially spaced shoulders on the leading end of the screw between which the part is located, said screw being movable forwardly relative to the part as it is moved to effect ejection to bring one of the shoulders into engagement with the part to close the axial passage and movable rearwardly relative to the part as it is moved in retraction to bring the other shoulder into engagement with the part to open the axial passage.

2. Injection apparatus comprising an elongate cylindrical chamber and a reciprocably mounted screw situated in the chamber by means of which plasticizable material is adapted to be plasticized and advanced along the chamber by rotation of the screw, a head at the leading end of the screw, axially spaced shoulders on the head, and means for preventing reverse flow of the plasticized material during ejection, said means comprising a part having an outer cylindrical surface corresponding substantially in diameter to the inside diameter of the chamber mounted on the head between the shoulders, said part containing an axial opening slidably engaged with the portion of the head situated between the shoulders, said opening providing a passageway from one side of the part to the other, which is adapted to be closed by engagement of the shoulder at the rear side of the part when the screw is advanced for effecting ejection, and to be opened by engagement of the shoulder at the front side of the part when the screw is retracted.

3. Injection apparatus according to claim 2, wherein the part is non-rotatably mounted on the head of the screw.

4. Injection apparatus according to claim 2, wherein the part has on its outer cylindrical surface a shallow helical groove.

5. Injection apparatus according to claim 2, wherein the head is detachably fixed to the leading end of the screw.

6. Injection apparatus according to claim 2, wherein the head has a threaded portion and the screw contains a threaded opening within which the threaded portion is screwed.

7. Injection apparatus according to claim 2, wherein the portion of the head between the shoulders is of non-circular cross-section and the part has an opening of corresponding non-circular cross-section for sliding engagement therewith.

8. Injection apparatus according to claim 2, wherein the shoulders on the head are conical and the part contains conical recesses at its opposite sides with which the shoulders are adapted to be engaged by reciprocal movement of the screw, on the one hand to close the passage as the screw is advanced and on the other hand to open the passage as the screw is retracted.

9. Injection apparatus according to claim 2, wherein a cap is threaded onto the forward end of the head, said cap embodying one of the shoulders.

10. Injection apparatus according to claim 2, wherein the part is axially shorter than the distance between the shoulders and contains at its opposite ends conical openings, and said shoulders have corresponding conical surfaces for engagement therewith, said passageway being inclined with respect to the axis of the head with the forward end located radially outward of the conical recess at the forward end and the rear end located radially inwardly of the recess at the rear end, said shoulder at the rear end being adapted by forward movement of the screw to effect closing of the passageway and forward movement of the part, and said shoulder at the forward end being adapted by engagement of the recess at the forward end by retraction of the screw to effect rearward movement of the part and opening of the passageway.

11. Injection apparatus according to claim 2, wherein the part is axially shorter than the distance between the shoulders and contains at its opposite ends conical openings, and said shoulders have corresponding conical surfaces for engagement therewith, said passageway comprising diametrically disposed channels extending along the axial opening and inclined with respect to the axis of the head and the forward ends located radially outwardly of the conical recess at the forward end and the rear ends located radially inwardly of the recess at the rear end, said shoulders at the rear end being adapted by forward movement of the screw to effect closing of the channels and forward movement of the part, and said shoulder at the forward end being adapted by engagement of the recess at the forward end by retraction of the screw to effect rearward movement of the part and opening of the channels at the rear end.

* * * * *